(12) United States Patent
Spahn

(10) Patent No.: US 7,351,978 B2
(45) Date of Patent: Apr. 1, 2008

(54) SOLID-STATE RADIATION DETECTOR

(75) Inventor: Martin Spahn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/304,676

(22) Filed: Dec. 16, 2005

(65) Prior Publication Data

US 2006/0180770 A1 Aug. 17, 2006

(30) Foreign Application Priority Data

Dec. 17, 2004 (DE) .................... 10 2004 060 870

(51) Int. Cl.
*G01T 1/24* (2006.01)
(52) U.S. Cl. ................................. 250/370.11
(58) Field of Classification Search ............ 250/370.11
See application file for complete search history.

(56) References Cited

U.S. PATENT DOCUMENTS

2002/0014592 A1* 2/2002 Rutten et al. ............... 250/368
2002/0109097 A1* 8/2002 Tashiro ................ 250/370.09

FOREIGN PATENT DOCUMENTS

DE 198 42 474 A1 3/2000
DE 100 34 575 A1 1/2002

OTHER PUBLICATIONS

Spahn, Martin · Heer, Volker · Freytag, R.: "Flachbilddetektoren in der Röntgendiagnostik", Der Radiologe, vol. 43, No. 5, 2003, pp. 340-350.
K.Stierstorfer, M.Spahn: "Self-normalizing method to measure the detective quantum efficiency of a wide range of x-ray detectors", Med. Phys. vol. 26, 1999, pp. 1312-1319.
German Office Action dated Mar. 21, 2007.

* cited by examiner

*Primary Examiner*—David Porta
*Assistant Examiner*—Marcus H Taningco
(74) *Attorney, Agent, or Firm*—Harness, Dickey & Pierce, P.L.C.

(57) ABSTRACT

A solid-state radiation detector includes an active pixel matrix, which is arranged at one side with a scintillator layer, which emits light that can be converted into electrical charge by the pixel matrix depending on incident radiation, in particular X-ray radiation, and which is arranged on a carrier at the other side. At least one layer that at least partly absorbs the light that originates from the scintillator layer and has penetrated into the carrier is provided at the carrier.

15 Claims, 2 Drawing Sheets

SOLID-STATE RADIATION DETECTOR

The present application hereby claims priority under 35 U.S.C. §119 on German patent application number DE 10 2004 060 870.9 filed Dec. 17, 2004, the entire contents of which is hereby incorporated herein by reference.

FIELD

The invention generally relates to a solid-state radiation detector. For example, it may relate to one having an active pixel matrix, arranged at one side with a scintillator layer, which emits light that can be converted into electrical charge by the pixel matrix depending on incident radiation, in particular X-ray radiation, and which is arranged on a carrier at the other side.

BACKGROUND

Digital solid-state radiation detectors, that is to say digital X-ray detectors of different types are increasingly being used in the context of radiation image recording, be it in traditional radiography, fluoroscopy, angiography or cardio-angiography. Such solid-state radiation detectors, also called flat detectors, are based on active pixel or read-out matrices which are composed e.g. of amorphous silicon. The incoming X-ray radiation is converted, in a scintillator layer functioning as an X-ray converter, into radiation which can be processed by the active pixel matrix and by which an electrical charge is generated in the photodiodes of the pixel matrix and is stored there.

The image quality of a solid-state radiation detector depends on a multiplicity of parameters. These include in particular the scintillator or converter material, cesium iodide (CsI) or gadolinium oxysulfide ($GdO_2S_2$) principally being used here, furthermore the design of the pixel matrix (size, filling factor, etc.) and also the read-out electronics etc. The image quality itself can be described by way of the modulation transfer functions MTF, the NPS value (NPS=noise power spectrum) and the effective quantum absorption DQE (DQE=detective quantum efficiency), the DQE being a derived variable. In solid-state detectors, the image quality is considerably reduced in particular by the so-called "low frequency drop" (LFD). The "low frequency drop" leads to a reduction of the MTF at low spatial frequencies, up to an order of magnitude of approximately 10%. This leads to significant losses in the DQE, which represents the actual variable which is relevant to image quality and which describes both the signal behavior and the noise behavior of the detector, to losses of up to approximately 20% since the MTF is incorporated quadratically in the calculation of the DQE.

In order consequently to improve the image quality of a solid-state radiation detector, it is therefore crucial to minimize the "low frequency drop", which is one of the central causes of the reduction of the DQE.

At least one embodiment of the invention is based on the problem of specifying a solid-state radiation detector in which the "low frequency drop" caused by the occurrence of scattering effects of the converted radiation is to be reduced, and of improving the image quality.

In order to improve upon or even solve this problem, in the case of a solid-state radiation detector, at least one embodiment of the invention provides for at least one layer that at least partly absorbs the light that originates from the scintillator layer and has penetrated into the carrier to be provided at the carrier.

At least one embodiment of the invention is based on the insight that a non-negligible scattered light component is brought about by light or light quanta brought about through the transparent sections of the pixel matrix into the matrix carrier, which is transparent to the light originating from the scintillator layer. The light that has penetrated into the carrier is reflected therein; the carrier acts virtually like an optical waveguide.

After single or multiple reflection at a different transparent section of the pixel matrix, the reflected light again enters into the scintillator layer, where it is likewise reflected and impinges on a different pixel than the one assigned to the generation location. That is to say that light which enters into the matrix carrier in an undesirable manner is coupled into the pixel matrix possibly at a completely different location. This scattered light component, which is added to the possible scattered component within the scintillator layer itself, is not negligible.

In order to lessen or even avoid at least one of the resultant disadvantages, at least one embodiment of the invention provides for the provision of an absorption layer at the carrier, which absorption layer at least partly absorbs the scintillator light that has penetrated undesirably into the carrier. This layer, which is preferably provided at the carrier at the opposite side to the pixel matrix, diminishes or even prevents any reflection processes from actually occurring in the carrier material. The scattered component on the carrier side may thereby be reduced or even minimized through to completely reduced. This may be accompanied by a significant reduction of the "low frequency drop", in association with a significant improvement of the MTF and the DQE.

The signal transfer behavior is consequently improved and the imaging properties are improved or even optimized. Comparable image qualities between detectors having DQE functions of varying quality can consequently be achieved with significantly lower X-ray doses, a lower DQE being tantamount to a higher dose requirement for obtaining a comparable image quality.

According to a first simple refinement of an embodiment of the invention, the absorption layer provided according to an embodiment of the invention may be a cured coating or a film. The coating may be for example an enamel coating or the like. The film may be a plastic film which is for example laminated onto the carrier or bonded to it in some other way.

With regard to the fact that the light emitted by the scintillator originates from a defined, known wavelength range, the cured coating may be a special color coating, the primary color of which is chosen such that precisely light having a wavelength corresponding to the scintillator light is absorbed. The film may correspondingly be a color film. Such a wavelength-specific absorption property is not mandatory, however; a black color coating or a black film that generally absorbs over the visible wavelength range may also be involved.

While the use of a simple coating or film is appropriate when the solid-state radiation detector does not have a reset light source serving for the defined resetting of the individual photodiodes of the pixel matrix, a solid-state radiation detector provided with a reset light source arranged adjacent to the carrier makes somewhat different requirements of the type or quality of the layer. In the case of such a solid-state radiation detector, according to an embodiment of the invention the layer is arranged between the carrier and the reset light source, which is preferably formed as a sheetlike reset light layer into which the reset light is coupled at a defined location.

At least when the reset light source is operated, that is to say therefore the resetting is effected, the layer is at least partly transparent to the light emitted by the reset light source. Here the layer has the task, on the one hand, of preventing part of the light converted at the scintillator from finding its way into the carrier, for example the glass substrate, and from there into the scintillator again and, consequently, impinging on a photodiode at a different location. On the other hand, it must be ensured that the reset light can pass via the carrier and the transparent regions in the active photodiode matrix into the scintillator and from there to the photodiodes. The absorption or transmission behavior of the layer must consequently be either adaptable or wavelength-selective.

In order to achieve this, the layer may preferably be variable or switchable in terms of its absorption behavior, preferably by way of an electrical control voltage that can be applied to the layer. This is possible, for example using an electrically drivable organic layer or an LCD layer. Both layers, which can be applied or produced in very thin fashion, make it possible, through application of a dedicated control or switching voltage, to switch or to vary the transmission or absorption behavior in specific regions. In both types of layer, an orientation of molecules integrated at the layer, for example of the liquid crystal molecules of an LCD or liquid crystal layer, is produced by means of the electric field generated upon application of the control voltage. This results in a change in the polarization properties of the layer, and consequently its transmission properties. The function of such organic or liquid crystal layers is generally known and does not require more detailed description.

If such a layer is used, it is thus possible, through application of a corresponding control voltage to the respective layer, for the absorption behavior either to be varied continuously variably between two limit values or to be switched between these two limit values.

As an alternative to the use of an electrically controllable layer, the solid-state radiation detector may, according to an embodiment of the invention, also be formed in such a way that the scintillator layer and the reset light source emit light from different wavelength ranges, the layer essentially only being absorbent for light from the wavelength range of the light emitted by the scintillator layer and essentially being transparent to the light emitted by the reset light source. This is based on the concept that the scintillator emits light from a relatively narrowly delimited wavelength range. Thus, CsI emits green light, for example.

If provision is then made of a layer which absorbs this light and is otherwise transparent to light outside this wavelength range, it is possible, with the use of a reset light source that emits light from such a different wavelength range, for this light readily to pass through the layer transparent to it into the carrier and from the latter to the scintillator or the pixel matrix. In this case, the reset light source emits in the red light range, for example. The layer used may in this case likewise be a cured coating, in particular a color coating, or a film, in particular a color film. Coatings or films which for example have special color centers or are naturally correspondingly colored are conceivable in this case.

BRIEF DESCRIPTION OF THE DRAWINGS

Further advantages, features and details of the invention emerge from the example embodiments described below and also with reference to the drawings, in which.

DETAILED DESCRIPTION OF THE EXAMPLE EMBODIMENTS

Figure 3:
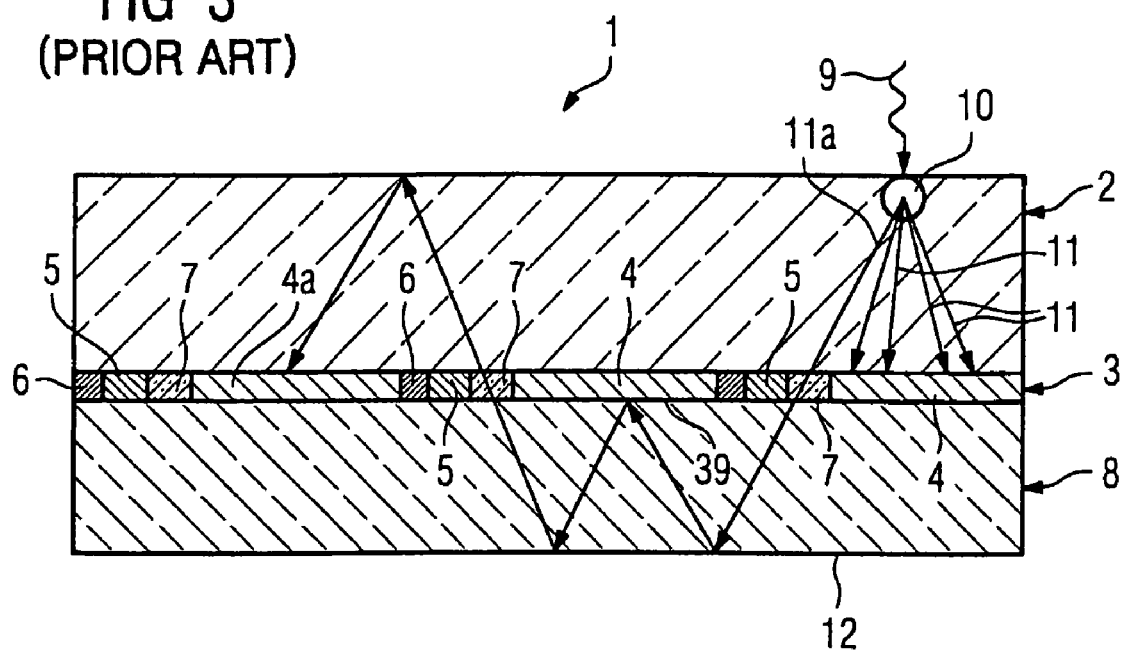
FIG. 3 shows a solid-state radiation detector in accordance with the prior art.

FIG. 3 shows a solid-state radiation detector 1 in accordance with the prior art. This detector has a scintillator layer 2, for example including a multiplicity of CsI needles grown in parallel on a carrier (not shown in greater detail). Said scintillator layer 2 is coupled to a pixel matrix 3, for example made of amorphous silicon or crystalline silicon. The pixel matrix 3 includes a multiplicity of individual photodiodes 4 with assigned TFT switches 5 and corresponding data lines 6. Situated between the individual photodiodes are transparent regions 7 by means of which the photodiodes are insulated from one another. The pixel matrix 3 is arranged on a carrier 8, here a glass substrate.

If an X-ray quantum 9 enters into the scintillator layer 2, it is converted into individual light quanta 11 at the absorption location 10. Most of the light quanta 11 impinge on the assigned photodiode 4. However, a portion of the light quanta, here the light quantum 11a, enters into the carrier 8 via the transparent region 7. It is reflected at the opposite interface 12 of the carrier 8.

In the example embodiment shown, multiple reflection also occurs at the opposite carrier interface 39 toward the pixel matrix 3. As shown in the figure, the multiply reflected light quantum enters into the scintillator layer 2 again via a different transparent region 7, and it is likewise reflected in said scintillator layer until it finally impinges on the photodiode 4a, where it is ultimately processed. As described, the carrier-side multiple reflection and feedback into the scintillator layer 2 lead to the "low frequency drop" and, resulting from this, to the impaired image qualities.

A solid-state radiation detector 13 according to an embodiment of the invention likewise has a scintillator layer 14, coupled to the latter a pixel matrix 15 including photodiodes 16, assigned TFT switches 17 and also data lines 18 and transparent regions 19, and also a carrier 20, preferably a glass substrate in this case, too. On the opposite side of the carrier 20 to the pixel matrix 15, a layer 21 is provided which is absorbent for light or light quanta 23 generated by the scintillator layer when an X-ray quantum 22 is incident. In the example shown, the light quantum 23a enters through a transparent region 19 of the pixel matrix 15 into the carrier 20, which is transparent to light having this wavelength. Upon impinging on the layer 21, however, the light quantum 23a is absorbed; reflection does not occur here, in contrast to the example in accordance with FIG. 3. That is to say the scattering or reflection within the carrier 20 and, resulting from this, the possible incorrect coupling into photodiodes elsewhere are precluded by this.

The layer 21 may be for example a color layer, e.g. color enamel, which has been applied to the carrier by being printed on, rolled on or the like and has subsequently been cured. However, a for example laminated-on plastic film or the like may also be involved. What is important is that the layer always absorbs light having the wavelength of the light generated at the scintillator.

Figure 2:
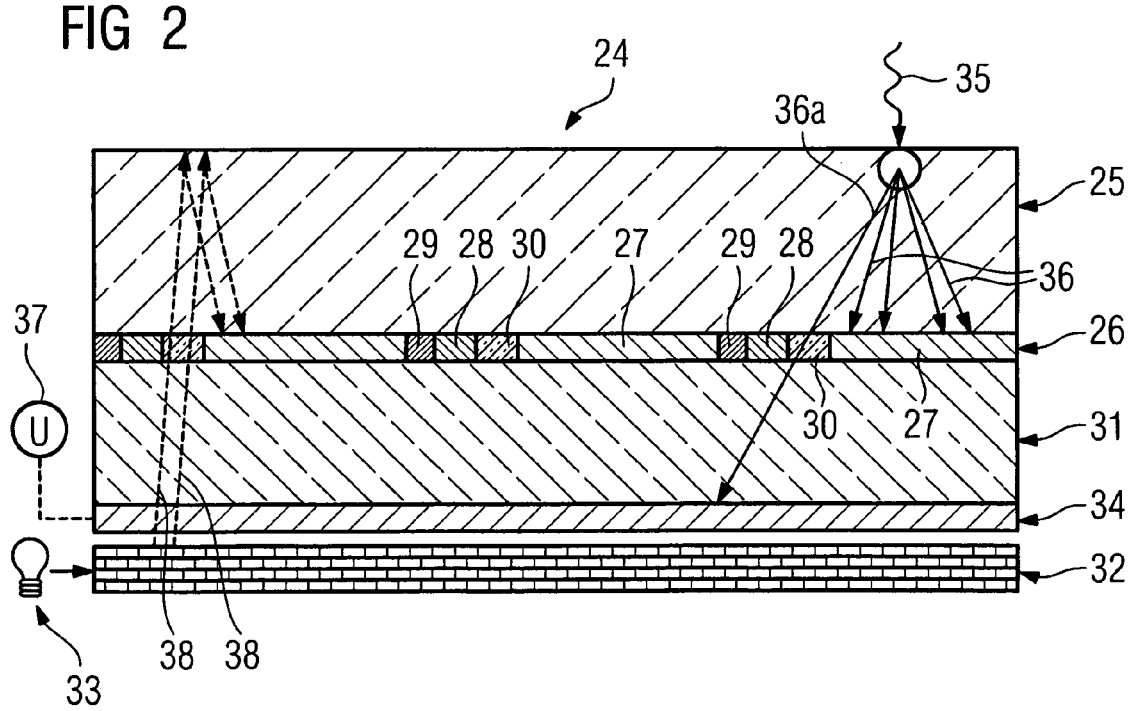
FIG. 2 shows a solid-state radiation detector according to the invention in a second embodiment with a reset light source.

FIG. 2 shows a further solid-state radiation detector 24 according to an embodiment of the invention with a scintillator layer 25, pixel matrix 26, comprising photodiodes 27, TFT switches 28, data lines 29 and transparent regions 30, and also a carrier 31, for example in the form of a glass substrate. However, this solid-state radiation detector 34 furthermore has a reset light layer 32, into which light is coupled by way of a light source 33 coupled to it light-optically. The reset light layer 32 forms a large-area reset light source.

In this case, too, a layer 34 is provided which absorbs light generated at the scintillator. When an X-ray quantum 35 is incident, the conversion into light quanta 36 is effected in this case too, here the light quantum 36a shown, which passes through a transparent region 30 into the carrier 31, being absorbed by the layer 34.

In addition to this absorption, however, the layer 34 must also be able to transmit the reset light generated by the reset light source, so that said reset light, as shown in FIG. 2, can enter through the transparent regions 30 into the scintillator layer 25, where it is reflected and impinges on the individual photodiodes 27 for the purpose of resetting the latter.

For this purpose, the layer 34 may be for example a layer which is electrically controllable in terms of its transmission or absorption behavior. A corresponding control or switching voltage may be applied to the layer 34 via a voltage source 37, for example, the voltage leading to the change in the layer behavior, as is shown by way of example in FIG. 2. By way of example an organic layer or an LCD layer or an LCD layer system may be used as the layer 34.

If such an electrically variable or switchable layer 34 is used, then it is driven and switched to be transparent to the reset light when the latter is fed in, that is to say when the reset light source is operated. Outside these time windows, the layer is switched to the state in which it is absorbent for the scintillator light. For this purpose, a suitable control device is to be provided which controls the reset operation depending on the recording and pixel read-out operation.

Figure 1:
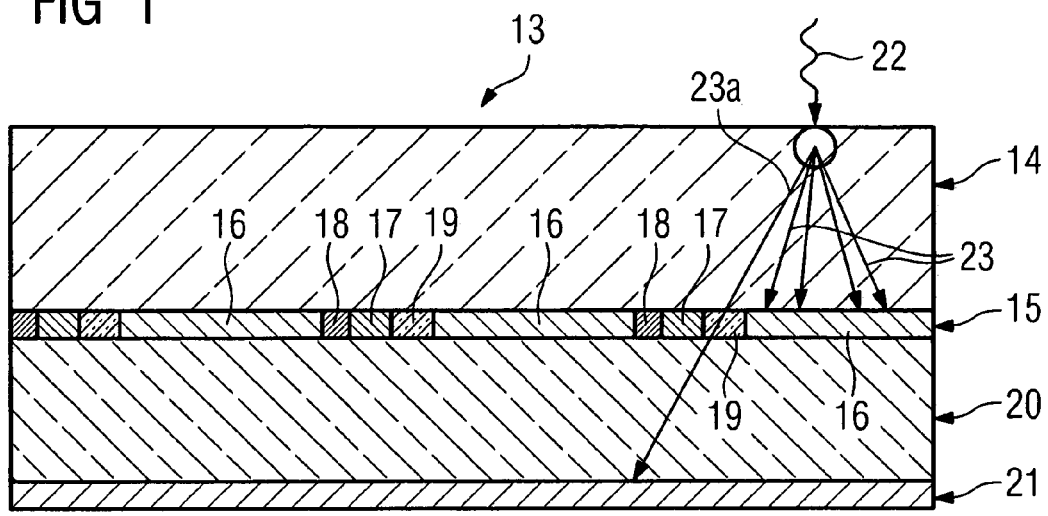
FIG. 1 shows a solid-state radiation detector according to the invention in a first embodiment.

As an alternative to this, the layer 34 may be a cured coating or film, similarly to the example in accordance with FIG. 1, said coating or film essentially only being absorbent for light having the wavelength or wavelength range of the light generated at the scintillator. If light having a different wavelength than the light wavelength at the scintillator is used as reset light 38, this can enter into the carrier 31 essentially unimpeded through the layer 34. That is to say that the layer 34 is in this case essentially absorbent for the scintillator light and essentially transparent to the reset light.

The use of the absorption layer according to the invention at the pixel matrix carrier advantageously permits suppression of the scattered light component generated by light reflection at the carrier and, resulting from this, a reduction of the "low frequency drop". The modulation transfer function thus does not exhibit a corresponding "low frequency drop", and the signal transfer at higher spatial frequencies is considerably improved. The corresponding solid-state radiation detector will supply a better image quality—for the same dose—than the same detector without the "low frequency drop" suppression according to the invention, or a comparable image quality for a lower X-ray dose.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A solid-state radiation detector comprising:
an active pixel matrix, arranged at an upper side with a scintillator layer, to emit light convertible into electrical charge by the pixel matrix depending on incident radiation and arranged on a carrier at a lower side, wherein at least one layer that at least partly absorbs the light that originates from the scintillator layer and has penetrated into the carrier is provided at the carrier and is not directly adjacent to the active pixel matrix.

2. The solid-state radiation detector as claimed in claim 1, wherein the layer is at least one of a cured coating and a film.

3. The solid-state radiation detector as claimed in claim 2, wherein the layer is at least one of a color coating and a color film.

4. The solid-state radiation detector as claimed in claim 1, wherein the layer is essentially only absorbent for light from the wavelength range of the light emitted by the scintillator layer.

5. The solid-state radiation detector as claimed in claim 1, further comprising a reset light source arranged adjacent to the carrier, the layer being provided between the carrier and the reset light source and, at least when the reset light source is operated, being at least partly transparent to the light emitted by the reset light source.

6. The solid-state radiation detector as claimed in claim 5, wherein the layer is at least one of variable and switchable in terms of its absorption behavior.

7. The solid-state radiation detector as claimed in claim 6, wherein the layer is at least one of electrically variable and switchable via a control voltage.

8. The solid-state radiation detector as claimed in claim 7, wherein the layer is an electrically drivable organic layer or an LCD layer.

9. The solid-state radiation detector as claimed in claim 5, wherein the scintillator layer and the reset light source emit light from different wavelength ranges, the layer essentially only being absorbent for light from the wavelength range of the light emitted by the scintillator layer and essentially being transparent to the light emitted by the reset light source.

10. The solid-state radiation detector as claimed in claim 9, wherein the layer is a cured coating.

11. The solid-state radiation detector as claimed in claim 2, wherein the layer is essentially only absorbent for light from the wavelength range of the light emitted by the scintillator layer.

12. The solid-state radiation detector as claimed in claim 3, wherein the layer is essentially only absorbent for light from the wavelength range of the light emitted by the scintillator layer.

13. The solid-state radiation detector as claimed in claim 9, wherein the layer is at least one of a color coating and a color film.

14. The solid-state radiation detector as claimed in claim 1, wherein the active pixel matrix emits light depending on incident X-ray radiation.

15. A solid-state radiation detector comprising:
an active pixel matrix, arranged at an upper side with a scintillator layer, to emit light convertible into electrical charge by the active pixel matrix depending on incident radiation and arranged at a lower side on a carrier which is transparent to the light, wherein at least one layer that at least partly absorbs the light that originates from the scintillator layer and has passed through the carrier is arranged at a side of the carrier opposite and not directly adjacent to the active pixel matrix.

* * * * *